United States Patent
Kim et al.

(10) Patent No.: US 10,730,776 B2
(45) Date of Patent: *Aug. 4, 2020

(54) APPARATUS FOR EVAPORATIVE CONCENTRATION OF WATER TO BE TREATED, WHICH USES HOT LIME SOFTENING, AND METHOD FOR EVAPORATIVE CONCENTRATION OF WATER USING THE SAME

(71) Applicant: DOOSAN HEAVY INDUSTRIES & CONSTRUCTION CO., LTD., Changwon-si, Gyeongsangnam-do (KR)

(72) Inventors: Sangmoon Kim, Seoul (KR); Gunmyung Lee, Daegu (KR); Weekwan Kang, Seoul (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/382,175

(22) Filed: Apr. 11, 2019

(65) Prior Publication Data

US 2019/0292083 A1 Sep. 26, 2019

Related U.S. Application Data

(63) Continuation of application No. 15/268,985, filed on Sep. 19, 2016, now Pat. No. 10,294,137.

(30) Foreign Application Priority Data

Sep. 24, 2015 (KR) .................. 10-2015-0135738

(51) Int. Cl.
*C02F 1/08* (2006.01)
*C02F 9/00* (2006.01)
(Continued)

(52) U.S. Cl.
CPC ............ *C02F 9/00* (2013.01); *B01D 1/06* (2013.01); *B01D 1/065* (2013.01); *B01D 1/28* (2013.01);
(Continued)

(58) Field of Classification Search
CPC .......... C02F 1/041; C02F 1/042; C02F 1/048; C02F 1/06; C02F 1/08; C02F 1/38;
(Continued)

(56) References Cited

U.S. PATENT DOCUMENTS

| 2,310,649 | A | * | 2/1943 | Peebles | .................. | B01D 1/12 |
| | | | | | | 159/27.1 |
| 4,018,656 | A | * | 4/1977 | Rogers | .................. | B01D 3/065 |
| | | | | | | 203/11 |
| 4,054,493 | A | * | 10/1977 | Roller | .................. | B01D 1/285 |
| | | | | | | 203/7 |
| 4,247,371 | A | * | 1/1981 | Roller | .................. | B01D 1/2846 |
| | | | | | | 159/24.3 |

(Continued)

*Primary Examiner* — Jonathan Miller
(74) *Attorney, Agent, or Firm* — Invenstone Patent, LLC

(57) ABSTRACT

An apparatus for evaporative concentration of water, containing hardness-causing substances, to be treated using hot lime softening, includes: a first evaporator configured to form first concentrated water from the water to be treated by evaporatively concentrating the water by first heat exchange with hot steam; a hot lime softener configured to precipitate and to separate hardness-causing substances contained in the first concentrated water from at least a portion of the first concentrated water from the first evaporator by reaction with lime and configured to remove the hardness-causing substances from the first concentrated water; and a second evaporator configured to form second concentrated water by further evaporatively concentrating at least a portion of the first concentrated water that passed through the hot lime softener by second heat exchange with hot steam.

20 Claims, 4 Drawing Sheets

(51) Int. Cl.
  *B01D 1/06* (2006.01)
  *B01D 1/28* (2006.01)
  *B01D 1/30* (2006.01)
  *C02F 1/06* (2006.01)
  *C02F 5/02* (2006.01)
  *C02F 5/06* (2006.01)
  *C02F 1/04* (2006.01)
  *C02F 1/38* (2006.01)

(52) U.S. Cl.
  CPC ............... *B01D 1/305* (2013.01); *C02F 1/06* (2013.01); *C02F 1/08* (2013.01); *C02F 5/025* (2013.01); *C02F 5/06* (2013.01); *C02F 1/041* (2013.01); *C02F 1/042* (2013.01); *C02F 1/048* (2013.01); *C02F 1/38* (2013.01); *C02F 2301/046* (2013.01); *C02F 2301/08* (2013.01)

(58) Field of Classification Search
  CPC ... C02F 9/00; C02F 5/025; C02F 5/06; B01D 1/06; B01D 1/065; B01D 1/28; B01D 1/305
  See application file for complete search history.

(56) References Cited

U.S. PATENT DOCUMENTS

| | | | |
|---|---|---|---|
| 6,551,466 B1* | 4/2003 | Kresnyak | B01D 1/0047 159/24.1 |
| 7,077,201 B2* | 7/2006 | Heins | C02F 1/04 166/266 |
| 7,150,320 B2* | 12/2006 | Heins | E21B 43/2406 166/266 |
| 7,428,926 B2* | 9/2008 | Heins | C02F 1/04 166/266 |
| 7,438,129 B2* | 10/2008 | Heins | C02F 1/04 166/266 |
| 7,681,643 B2* | 3/2010 | Heins | E21B 43/24 159/24.1 |
| 8,741,100 B2* | 6/2014 | Duesel, Jr. | B01D 1/14 159/4.01 |
| 8,741,101 B2* | 6/2014 | Duesel, Jr. | B01D 1/18 159/4.01 |
| 8,951,392 B2* | 2/2015 | James | B01D 1/065 159/13.2 |
| 9,085,471 B2* | 7/2015 | Mandigo | C02F 1/041 |
| 10,294,137 B2* | 5/2019 | Kim | B01D 1/065 |
| 2002/0088703 A1* | 7/2002 | Walker | B01D 1/0094 203/10 |

* cited by examiner

APPARATUS FOR EVAPORATIVE CONCENTRATION OF WATER TO BE TREATED, WHICH USES HOT LIME SOFTENING, AND METHOD FOR EVAPORATIVE CONCENTRATION OF WATER USING THE SAME

CROSS-REFERENCE TO RELATED APPLICATIONS

This application is a continuation of U.S. application Ser. No. 15/268,985, filed on Sep. 19, 2016, which claims benefit of priority to Korean Patent Application No. 10-2015-0135738 filed on Sep. 24, 2015 in the Korean Intellectual Property Office, the disclosure of which is incorporated herein by reference in its entirety.

BACKGROUND

1. Field

Apparatuses and methods consistent with exemplary embodiments relate to a technology for evaporative concentration of water, containing hardness-causing substances, to be treated, and more particularly to an apparatus and method for evaporative concentration of water to be treated, in which the water to be treated is evaporatively concentrated by sequential passage through a first evaporator, a hot lime softener and a second evaporator so that hardness-causing substances in the water are effectively removed therefrom by hot lime softening to prevent scale formation, and in which a separate heat source for satisfying the operating temperature of the hot lime softener is not required, thus reducing the operation cost.

2. Description of the Related Art

Zero Liquid Discharge (ZLD) systems are processes in which wastewater is treated so that flowback water (water to be treated) or produced water will be recycled and a small amount of sludge excluding treated water will be discharged to the outside. Recently, companies and academic circles are becoming more and more interested in Zero Liquid Discharge (ZLD) systems.

There are indications of a gradual increase of the supply price of industrial water, a gradual increase of production costs due to an increase of discharge fees by regulations on total quantity of effluent water, and a scheduled enactment of a recycling obligation of more than ⅓ of effluent discharge flow. Also, companies and academic circles value judgments are changing to avoid concerns about environmental pollution problems. Recently, there has been a movement to introduce zero liquid discharge systems not only for specific wastewater but also for all water.

In foreign countries, ZLD systems have been introduced long ago. In Japan, ZLD systems are currently operated in about 100 places. ZLD systems in Japan are installed mainly in high-value-added semiconductor plants. As a large amount of high-quality water is required or the areas of installation of ZLD systems correspond to areas such as national parks in which discharge of specific pollutants is limited, ZLD systems that require high installation and operation costs are introduced and operated.

Particularly, in the case of Canon Inc. (Oita, Japan) that produces copier cartridge products, Oita was incorporated into total emission regulation areas, and thus the neighboring fisheries cooperative association requested the prohibition of wastewater discharge in order to protect fish resources, and for this reason, a ZLD system was introduced in Canon Inc. Meanwhile, UMC Japan, a semiconductor manufacturing plant, is located in a fair park, and thus a ZLD system was introduced therein.

In the case of the USA, it is estimated that ZLD systems are installed and operated in several thousand places. ZLD systems in the USA have been introduced mainly either in area to which strict effluent water quality standards established by each state are applied, or in plants located in areas with poor water supply conditions, such as deserts.

Particularly, La Paloma Plant, a steam power plant located in the middle of the Mojave Desert, Calif., is located in a large agricultural area in which effluent water quality standards are very strict and the supply of water from areas neighboring the Mojave Desert is poor and also the price of water is high. For this reason, a ZLD system was introduced therein, and water recovered from the ZLD system is recycled as boiler feed water to operate the turbine of the power plant.

In the case of Intel Inc., a semiconductor manufacturing plant, a ZLD system was introduced, because emission standards are strict and the Arizona area lacks industrial water.

Such ZLD systems are largely classified into reverse osmosis (RO) ZLD systems that perform separation using osmotic pressure, and thermal ZLD systems that perform separation by thermal evaporative concentration and phase change.

Among them, the thermal ZLD is principally based on the evaporative concentration technology utilized in the $19^{th}$ century food industry, and intensified environmental regulations leading to increased reuse of water resources have increased demands in thermal ZLD technology applied in various industry fields. The thermal ZLD process using a heat-induced phase change is most effective for non-degradable wastewater.

In recent years, methods for recovering oil sands as alternative resources for conventional oils which are becoming more and more exhausted have been of increasing interest. Particularly, when steam-assisted gravity drainage (SAGD), which is one of these methods, is used, water treatment using the above-described ZLD system is considered a very important process.

This is because water separated in a process of refining recovered oil sands contains contaminants such as silica, and thus causes environmental problems when being discharged without treatment, while it is very efficient to purify water separated from oil sands and recycle the purified water as steam to be injected into oil wells in which oil sands are buried.

Flowback water (or produced water) generated in the process of refining oil sands as described above is generally separated from sludge by an evaporative concentration process. Herein, hardness-causing substances, such as silica, calcium (Ca) and magnesium (Mg), which are present in the water to be treated, can be precipitated during the evaporative concentration process to cause scale on the overall ZLD system including an evaporator. For this reason, a technology for controlling such substances has attracted attention.

FIG. 1 schematically shows a system of the related art which inhibits precipitation of hardness-causing substances when water to be treated, generated in SAGD systems or the like, is concentrated by evaporation.

Referring to FIG. 1, water to be treated, introduced into an evaporator 34 through a water inlet unit 31, is separated into steam and sludge by an evaporative concentration process, and the separated steam and sludge move to the respective discharge units 35 and 36.

Before the water to be treated is introduced into the evaporator 34, the pH of the water is increased by a basic substance such as sodium hydroxide (NaOH), injected from a pH-adjusting substance tank 32. As shown in the graph of FIG. 2, the solubility of silica in water is proportional to pH, and thus precipitation of silica during evaporative concentration of the water in the evaporator can be inhibited.

In another embodiment of the technology of the related art, before the water to be treated is introduced into the evaporator 34, it may be softened by a lime softener 33. In the lime softener 33, hardness-causing substances such as calcium and magnesium are precipitated and separated by reaction with a substance such as lime, whereby softening of the water to be treated is achieved.

Specifically, as shown in the following chemical formula 1, carbonate ($HCO_3$) of calcium reacts with lime ($Ca(OH)_2$ or $CaO$) to form insoluble calcium carbonate ($CaCO_3$), whereby it can be separated.

$$Ca(HCO_3)_2 + Ca(OH)_2 \rightarrow 2CaCO_3\downarrow + 2H_2O \quad \text{Chemical Formula 1}$$

In addition, as shown in the following chemical formula 2, calcium bicarbonate (calcium sulfate, calcium chloride, etc.) reacts with soda ash ($Na_2CO_3$) to form calcium carbonate, whereby it can be removed.

$$CaSO_4 + Na_2CO_3 \rightarrow CaCO_3\downarrow + Na_2SO_4$$

$$CaCl_2 + Na_2CO_3 \rightarrow CaCO_3\downarrow + 2NaCl \quad \text{Chemical Formula 2}$$

Meanwhile, as shown in the following chemical formula 3, magnesium carbonate or bicarbonate (magnesium sulfate, magnesium chloride, etc.) reacts with lime to form insoluble magnesium hydroxide ($Mg(OH)_2$), whereby it can be separated.

$$Mg(HCO_3)_2 + Ca(OH)_2 \rightarrow CaCO_3\downarrow + MgCO_3 + 2H_2O$$

$$MgCO_3 + Ca(OH)_2 \rightarrow CaCO_3\downarrow + Mg(OH)_2\downarrow$$

$$MgCl_2 + Ca(OH)_2 \rightarrow Mg(OH)_2\downarrow + CaCl_2$$

$$MgSO_4 + Ca(OH)_2 \rightarrow Mg(OH)_2\downarrow + CaSO_4 \quad \text{Chemical Formula 3}$$

In the case of silica, it can either adhere to the surface of magnesium ions which are precipitated by the above-described lime softening process or form calcium-magnesium silicate, whereby it can be separated and removed.

Such lime softening systems can be classified according to operating temperature into three types: a cold lime softener (CLS), a warm lime softener (WLS) and a hot lime softener (HLS). As shown in Table 1 below, the ability to remove hardness-causing substances, which is indicated by the concentration of hardness-causing substances remaining in lime-softened water, increases as it goes from the cold lime softener to the hot lime softener. However, the hot lime softener has a disadvantage in that, because it requires a high operating temperature, it requires a separate heat source.

TABLE 1

| Type of lime softener | Operating temperature (° C.) | Remaining concentration (mg/L) of hardness-causing substance |
|---|---|---|
| CLS | 15 to 60 | 80 to 110 |
| WLS | 60 to 85 | 30 to 50 |
| HLS | 90 to 110 | 15 to 25 |

In the evaporative concentration system of the related art shown in FIG. 1, the cold or warm lime softener is used as the lime softener 33, because there is a limit to pretreating the water, introduced into the lime softener 33, by using an additional heat source. When this cold or warm lime softener is used, the amount of hardness-causing substances removed is smaller than when the hot lime softener is used. Thus, the cold or warm lime softeners has a problem in that it should be used together with the pH-adjusting system as described above so that it can effectively inhibit scale formation caused by precipitation of hardness-causing substances.

SUMMARY

The present disclosure is intended to solve problems occurring in the above-described technology of the related art for evaporative concentration of water to be treated containing hardness-causing substances, and is also intended to provide an apparatus and method for evaporative concentration of water to be treated, in which a hot lime softener for removing hardness-causing substances from the water to be treated is used to improve the ability to remove hardness-causing substances, so that scale formation can be effectively inhibited without having to use a separate pH adjusting system, and at the same time, a process of passing the water to be treated through a first evaporator is first performed, thereby eliminating the need for an additional separate heat source for satisfying the operating temperature condition of the hot lime softener.

In one aspect, one or more exemplary embodiments provide an apparatus for evaporative concentration of water to be treated containing hardness-causing substances. Specifically, one or more exemplary embodiments provide an apparatus for evaporative concentration of water to be treated, which uses hot lime softening, the apparatus including:

a first evaporator configured such that the water to be treated is introduced therein and evaporatively concentrated by exchange with hot steam to thereby foi n first concentrated water;

a hot lime softener configured such that all or part of the first concentrated water is introduced therein and hardness-causing substances contained in the first concentrated water are precipitated and separated by reaction with lime, thereby being removed; and a second evaporator configured such that all or part of the first concentrated water that passed through the hot lime softener is introduced therein and further evaporatively concentrated by heat exchange with hot steam to thereby form second concentrated water.

Herein, the temperature of the first concentrated water that is introduced into the hot lime softener may be approximately 90° C. to 110° C., and the first evaporator may have a concentration factor of 5-10.

In addition, the apparatus for evaporative evaporation according to the exemplary embodiment may further include a recycling line that enables all or part of the first concentrated water and/or the second concentrated water to be introduced into the first evaporator or the second evaporator so as to be concentrated again.

Meanwhile, the first evaporator and/or the second evaporator may be a vertical tube falling film (VTFF) evaporator including a plurality of evaporation tubes 8 therein and configured such that the water to be treated is evaporated by heat exchange with hot steam supplied to the outer walls of the evaporation tubes while the water flows in the form of a falling film along the inner walls of the evaporation tubes 8.

Furthermore, the first evaporator and/or the second evaporator may be a reduced pressure evaporator in which reduced pressure evaporation occurs.

The apparatus for evaporative concentration according to the exemplary embodiment may further include a gas-liquid separator configured such that steam present as two phases together with the concentrated water in the bottom of the first evaporator and/or the second evaporator is introduced therein and water mist remaining in the steam is separated and removed, and condensed water formed by heat exchange of hot steam supplied to the first evaporator and/or the second evaporator is sprayed to the steam introduced into the gas-liquid separator so that hardness-causing substances contained in the steam are separated and removed.

The apparatus according to the exemplary embodiment may further include a compressor configured to compress the steam from which hardness-causing substances and water mist were removed in the gas-liquid separator and to supply the compressed steam to the first evaporator 1 and/or the second evaporator.

The gas-liquid separator is preferably a cyclone-type gas-liquid separator configured such that the condensed water is sprayed in the tangential direction of the inner circumferential surface of the gas-liquid separator and moves in the form of spiral flow along the inner circumferential surface of the gas-liquid separator.

In addition, the gas-liquid separator may include: a chamber having an internal space configured such that steam is discharged through a steam outlet at the top and condensed water is discharged through a concentrate outlet at the bottom; an inlet unit connected to the side of the chamber in the tangential direction of the inner circumferential surface of the chamber such that the condensed water moves in the form of spiral flow along the inner circumferential surface of the chamber, the inlet unit being configured to spray the condensed water; and a demister disposed in the upper portion of the chamber so as to divide the internal space of the chamber and configured to remove mist contained in steam. In addition, the gas-liquid separator preferably further include, in the chamber, at least one barrier 44 for preventing rising of mist contained in the steam.

Herein, the barrier is preferably formed to protrude from the inner wall of the chamber 43 so as to be inclined upward at an angle of approximately 90-180°.

In addition, the apparatus for evaporative concentration according to the exemplary embodiment may further include a heat exchanger in which the condensed water formed by heat exchange of hot steam supplied to the first evaporator and/or the second evaporator is heat-exchanged with the water to be treated which is introduced into the first evaporator.

In another aspect, the exemplary embodiment provides a method for evaporative concentration of water to be treated containing hardness-causing substances. Specifically, the exemplary embodiment provides a method for evaporative concentration of water to be treated, which uses hot lime softening, the method including the steps of: (a) introducing the water to be treated into a first evaporator in which it is evaporatively concentrated by heat exchange with hot steam, thereby forming first concentrated water; (b) introducing all or part of the first concentrated water into a hot lime softener in which hardness-causing substances contained in the first concentrated water are precipitated and separated by reaction with lime, thereby being removed; and (c) introducing all or part of the first concentrated water, from which the hardness-causing substances were removed, into a second evaporator in which it is further evaporatively concentrated by heat exchange with hot steam, thereby forming second concentrated water.

Herein, the temperature of the first concentrated water that is introduced into the hot lime softener may be approximately 90° C. to 110° C., and the first evaporator may be operated to have a concentration factor of 5-10.

Meanwhile, step (a) and/or step (c) may include a process in which all or part of the first concentrated water or the second concentrated water is introduced again into the first evaporator or the second evaporator so that it is concentrated again.

In addition, the evaporative concentration in step (a) and/or step (c) may be achieved by reduced pressure evaporation.

The method for evaporative concentration according to the exemplary embodiment may further include a step in which steam present as two phases together with the concentrated water after step (a) and/or step (c) is introduced into a gas-liquid separator in which water mist remaining in the steam is separated and removed, and condensed water formed by heat exchange of hot steam supplied to the first evaporator and/or the second evaporator is sprayed to the steam which is introduced into the gas-liquid separator so that hardness-causing substances contained in the steam are separated and removed.

Moreover, the method for evaporative concentration according to the exemplary embodiment may further include, before step (a), a step in which condensed water formed by heat exchange of hot steam supplied to the first evaporator and/or the second evaporator is heat-exchanged with the water to be treated which is introduced into the first evaporator.

In another aspect, the exemplary embodiment provides an apparatus for evaporative concentration of water, containing hardness-causing substances, to be treated using hot lime softening, the apparatus including: a first evaporator configured to form first concentrated water from the water to be treated by evaporatively concentrating the water by first heat exchange with hot steam; a hot lime softener configured to precipitate and to separate hardness-causing substances contained in the first concentrated water from at least a portion of the first concentrated water from the first evaporator by reaction with lime and configured to remove the hardness-causing substances from the first concentrated water; and a second evaporator configured to form second concentrated water by further evaporatively concentrating at least a portion of the first concentrated water that passed through the hot lime softener by second heat exchange with hot steam.

A temperature of the first concentrated water that may be introduced into the hot lime softener may be approximately 90 r to 110° C.

The first evaporator may have a concentration factor of 5-10.

The apparatus may further include a recycling line providing a path for at least a portion of at least one of the first concentrated water and the second concentrated water to be introduced into the first evaporator or the second evaporator so as to be concentrated again.

At least one of the first evaporator and the second evaporator may be a vertical tube falling film (VTFF) evaporator including a plurality of evaporation tubes therein and configured to evaporate the water to be treated by heat exchange with hot steam supplied to outer walls of the plurality of evaporation tubes while the water flows in the form of a falling film along inner walls of the evaporation tubes.

At least one of the first evaporator and the second evaporator may be a reduced pressure evaporator in which reduced pressure evaporation occurs.

The apparatus may further include a gas-liquid separator configured to separate and remove water mist remaining in steam present as two phases together with concentrated water at a bottom of at least one of the first evaporator and the second evaporator, wherein condensed water formed by heat exchange of hot steam supplied to at least one of the first evaporator and the second evaporator is sprayed to the steam so that hardness-causing substances contained in the steam are separated and removed.

The apparatus may further include a compressor configured to compress the steam from which the hardness-causing substances and the water mist were removed in the gas-liquid separator and to supply the compressed steam to at least one of the first evaporator and the second evaporator.

The gas-liquid separator may include a cyclone-type gas-liquid separator configured to spray the condensed water in a tangential direction of an inner circumferential surface of the gas-liquid separator and to move the condensed water in a form of spiral flow along the inner circumferential surface of the gas-liquid separator.

The gas-liquid separator may include: a chamber having an internal space, a steam outlet and a concentrate outlet, wherein steam is discharged through the steam outlet provided at a top of the chamber and the condensed water is discharged through the concentrate outlet provided at a bottom of the chamber; an inlet unit connected to a side of the chamber in the tangential direction of the inner circumferential surface of the chamber such that the condensed water moves in the form of spiral flow along the inner circumferential surface of the chamber, the inlet unit being configured to spray the condensed water; and a demister disposed in an upper portion of the chamber so as to divide the internal space of the chamber and configured to remove mist contained in the steam.

The gas-liquid separator may further include, in the chamber, at least one harrier configured to prevent the mist contained in the steam from rising.

The at least one barrier may be configured to protrude from an inner wall of the chamber so as to be inclined upward at an angle of approximately 90-180°.

The apparatus may further include a heat exchanger in which condensed water formed by heat exchange of hot steam supplied to at least one of the first evaporator and the second evaporator is heat-exchanged with the water to be treated which is introduced into the first evaporator.

In another aspect, the exemplary embodiment provides a method for evaporative concentration of water, containing hardness-causing substances, to be treated using hot lime softening, the method including: introducing the water to be treated into a first evaporator in which the introduced water is evaporatively concentrated by heat exchange with hot steam, thereby forming first concentrated water; introducing at least a portion of the first concentrated water into a hot lime softener in which hardness-causing substances contained in the first concentrated water are precipitated and separated by reaction with lime, thereby the hardness-causing substances being removed; and introducing at least a portion of the first concentrated water, from which the hardness-causing substances were removed, into a second evaporator in which the at least a portion of the first concentrated water, from which the hardness-causing substances were removed, is further evaporatively concentrated by heat exchange with hot steam, thereby forming second concentrated water.

A temperature of the first concentrated water that is introduced into the hot lime softener may be approximately 90° C. to 110° C.

The first evaporator may be operated to have a concentration factor of 5-10.

At least one of the introducing the water to be treated into the first evaporator and the introducing the at least a portion of the first concentrated water, from which the hardness-causing substances were removed includes a process in which at least a portion of the first concentrated water or the second concentrated water is introduced again into the first evaporator or the second evaporator so that it is concentrated again.

The evaporative concentration in at least one of the introducing the water to be treated into the first evaporator and the introducing the at least a portion of the first concentrated water, from which the hardness-causing substances were removed may be performed by reduced pressure evaporation.

The method may further include introducing steam present as two phases together with the concentrated water after at least one of the introducing the water to be treated into the first evaporator and the introducing the at least a portion of the first concentrated water, from which the hardness-causing substances were removed into a gas-liquid separator in which water mist remaining in the steam is separated and removed, wherein condensed water formed by heat exchange of hot steam supplied to at least one of the first evaporator and the second evaporator is sprayed to the steam which is introduced into the gas-liquid separator so that hardness-causing substances contained in the steam are separated and removed.

The method may further include, before the introducing the water to be treated into the first evaporator, heat-exchanging condensed water formed by heat exchange of hot steam supplied to at least one of the first evaporator and the second evaporator with the water to be treated which is introduced into the first evaporator.

According to the exemplary embodiment, water to be treated is evaporatively concentrated by sequential passage through the first evaporator, the hot lime softener and the second evaporator so that hardness-causing substances are effectively removed therefrom by hot lime softening to thereby prevent scale formation, and which do not require a separate heat source for satisfying the operating temperature of the hot lime softener, thus reducing the operation cost.

In addition, because water to be treated is evaporatively concentrated through the first evaporator while the flow rate thereof is reduced, the capacity of the hot lime softener and the amount of lime introduced into the hot lime softener can be reduced. In addition, because concentrated water from which hardness-causing substances were almost removed is introduced into the second evaporator, a relatively low-grade material may be applied to the second evaporator, thus reducing equipment costs.

DETAILED DESCRIPTION

Figure 1:
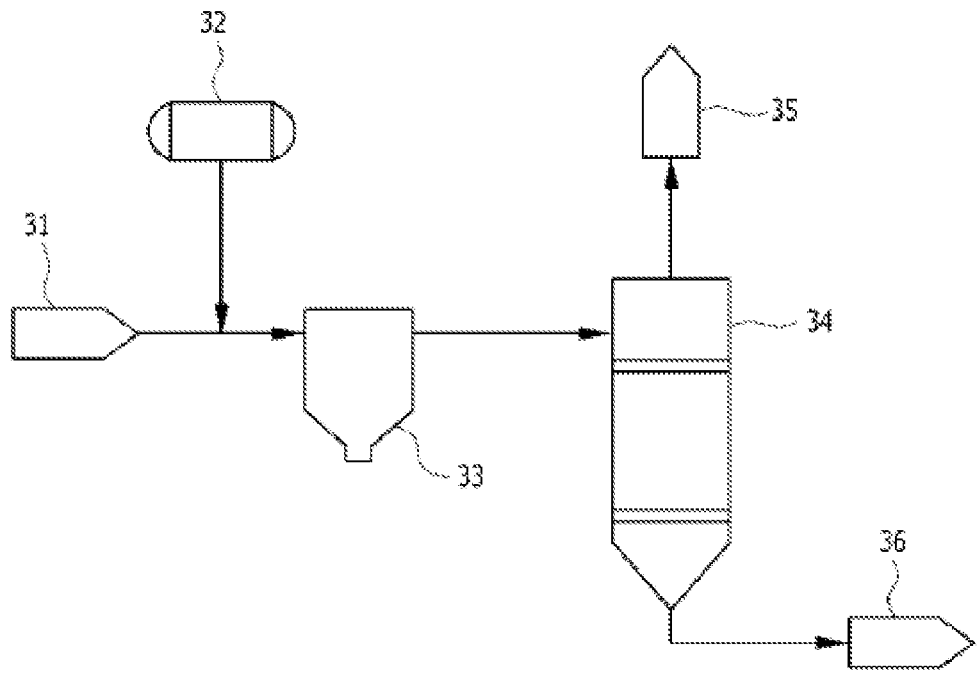
FIG. 1 schematically shows a system of the related art which inhibits precipitation of hardness-causing substances when water to be treated is concentrated by evaporation.
Figure 2:
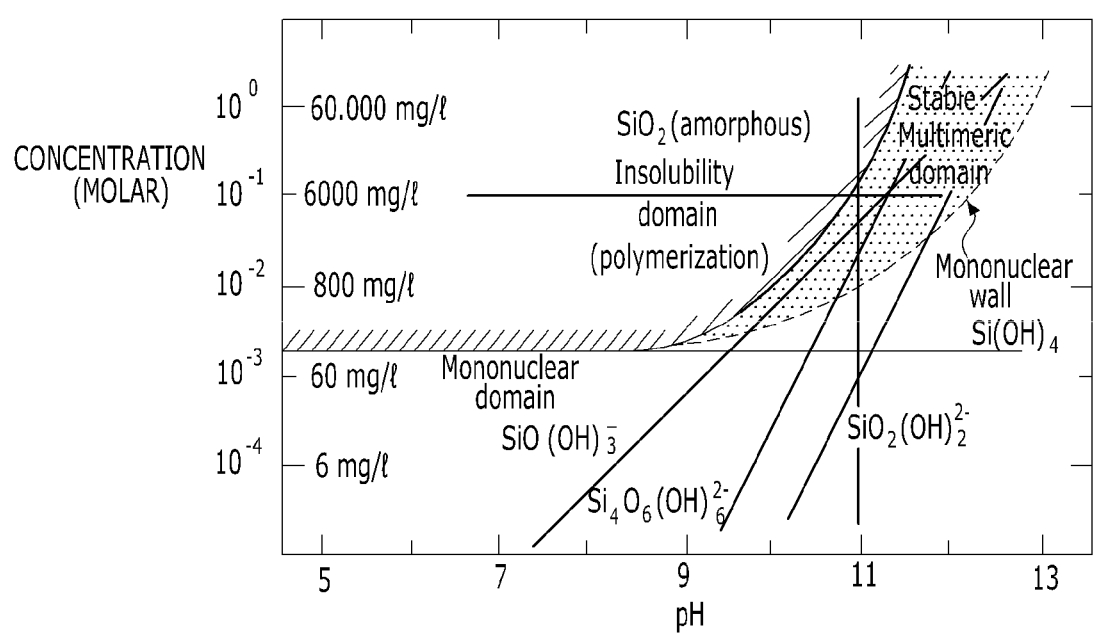
FIG. 2 graphically shows the correlation between the solubility of silica in water and pH.

Hereinafter, preferred exemplary embodiments will be described in detail with reference to the accompanying drawings. The terms and words used in the specification and claims should not be interpreted as being limited to typical meanings or dictionary definitions, but should be interpreted as having meanings and concepts relevant to the technical scope of the inventive concept.

Throughout the specification, when a first component is referred to as being "on" or "under" a second component, it not only refers to a case where the first component is directly on the second layer but also a case where a third component exists between the first component and the second component.

Throughout the specification, when any part is referred to as comprising any component, it does not exclude other components, but may further comprise other components, unless otherwise specified.

Reference characters used to designate method steps are used for convenience of explanation, and they do not mean the order of the steps and the steps may be performed in different orders, unless the order is specifically stated. That is, the steps may be performed in the order described and substantially simultaneously, but they may be performed in reverse direction.

It is to be understood that, in the following description, the same elements will be denoted by the same reference numerals if possible, although they are shown in different drawings. Further, in the following description, the detailed description of known functions and configurations herein will be omitted when it may interfere with the understanding of the exemplary embodiments.

In addition, terms, such as first, second, A, B, (a), (b) or the like may be used herein when describing components of the exemplary embodiment. Each of these terms is not used to define an essence, order or sequence of a corresponding component but used merely to distinguish the corresponding component from other components.

It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
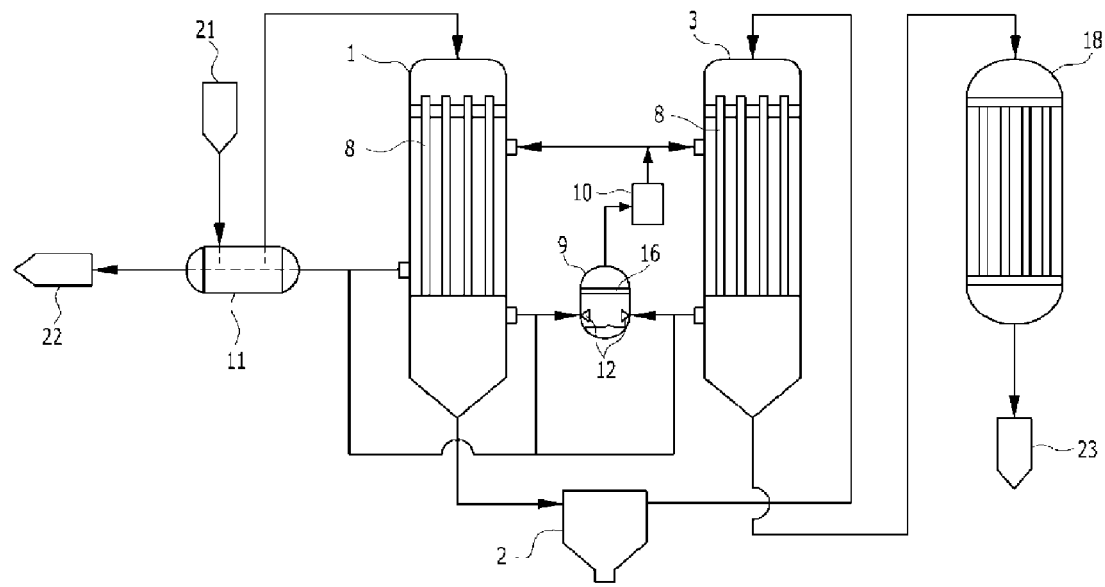
FIG. 3 schematically shows an apparatus for evaporative concentration of water to be treated, which uses hot lime softening, according to an exemplary embodiment.

FIG. 3 schematically shows an apparatus for evaporative concentration of water to be treated, which uses hot lime softening, according to an exemplary embodiment.

The apparatus for evaporative concentration of water to be treated, which uses hot lime softening, according to the exemplary embodiment, is an apparatus for evaporative concentration of water containing hardness-causing substances. As shown in FIG. 3, the apparatus of the exemplary embodiment may comprise: a first evaporator 1 configured such that water to be treated is introduced therein and evaporatively concentrated by exchange with hot steam to form first concentrated water; a hot lime softener 2 configured such that all or part of the first concentrated water is introduced therein and a hardness-causing substance contained in the first concentrated water is precipitated and separated by reaction with lime so as to be removed; and a second evaporator 3 configured such that all or part of the first concentrated water that passed through the hot lime softener 2 is introduced therein and further evaporatively concentrated by heat exchange with hot steam to form second concentrated water.

Water generated in a system such as a SAGD is introduced into the first evaporator 1 through a water inlet unit 21. Before the water is introduced into the first evaporator 1, it may pass through a heating unit such as a heat exchanger 11, whereby it can be preheated for evaporative concentration.

The water introduced into the first evaporator 1 is heat-exchanged with hot steam in the first evaporator 1 while coming into direct or indirect contact with the hot steam to thereby form first concentrated water, and the first concentrated water is collected in the bottom of the first evaporator 1, also called "sump reservoir" and present as two phases together with evaporated steam.

As the first evaporator 1 as described above, a vertical tube falling film (VTFF) evaporator may be used. This vertical tube falling film evaporator includes a plurality of evaporation tubes 8 therein and is characterized in that the water introduced into the evaporator is evaporated with heat exchange with hot steam supplied to the outer walls of the evaporation tubes 8 while it flows in the form of a falling film along the inner walls of the evaporation tubes 8.

Figure 5:
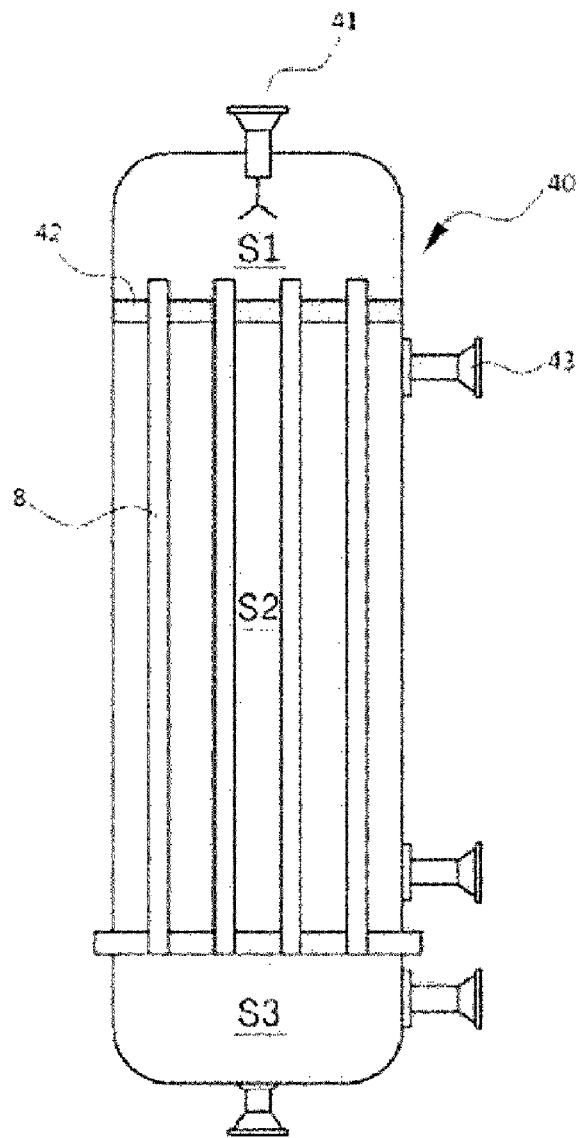
FIG. 5 schematically shows an example of the structure of a vertical tube falling film evaporator which can be used as a first evaporator and/or a second evaporator.

FIG. 5 shows an embodiment of the vertical tube falling film evaporator. As shown therein, in the vertical tube falling film evaporator, a plate-type flow uniformity unit 42 is horizontally provided at the upper portion of a cylindrical housing 40, and a water inlet 41 is disposed at a level higher than the flow uniformity unit 42. This vertical tube falling film evaporator may be configured such that the water introduced therein is supplied to a space S1 upstream of the flow uniformity unit 42.

In the housing 40, a plurality of evaporation tubes 8 are densely disposed. The evaporation tubes 8 are disposed such that the top thereof passes through the flow uniformity unit 42 and such that the upstream space S1 and the internal space 8 communicate with each other. Thus, the water supplied to the upstream space S1 flows down along the inner walls of the evaporation tubes 8. While the water that flows down along the inner walls of the evaporation tubes 8 in the form of a falling film is heated by heat exchange with steam, supplied to a heat-exchange space S2 in the middle portion of the housing 40, with the walls of the evaporation tubes 8 interposed therebetween, it is evaporated.

This vertical tube falling film evaporator has advantages in that it can inhibit an increase in boiling point without loss of pressure in the apparatus, and can minimize the time of contact with a heating fluid such as steam because it shows a very high heat transfer rate even when the difference in temperature from the heating fluid is small. In addition, it can minimize an increase in the temperature of heat-sensitive liquid, because a temperature gradient in a liquid film kept at about 1-2 mm is very small.

Furthermore, the first evaporator 1 may be a reduced pressure evaporator in which evaporative concentration is performed by reduced pressure evaporation. Preferably, it can achieve evaporative concentration at a vacuum of about $10^{-2}$ mmHg or less therein.

Meanwhile, because the water to be treated that is introduced into the first evaporator 1 is not subjected to a separate pretreatment process for hardness-causing substances, it is important to concentrate the water in such a manner that hardness-causing substances are not precipitated in the first evaporator 1.

Thus, the water to be treated may be concentrated such that a concentration factor (obtained by dividing the concentration of hardness-causing substances in the first concentrated water flowing into the hot lime softener 2 by the concentration of hardness-causing substances flowing into the first evaporator 1) is in a certain range. In this case, precipitation of hardness-causing substances such as silica can be prevented. Preferably, the concentration factor may be 5-10.

Herein, the concentration factor of the first evaporator 1 refers either to the ratio of the concentration of a concentrate discharged from the first evaporator to the concentration of the water flowing into the first evaporator 1, or the ratio of the flow rate of a concentrate discharged from the first concentrator 1 to the flow rate of a concentrate flowing into the first evaporator 1.

All or part of the first concentrated water, obtained by evaporative concentration in the first evaporator 1, is introduced into a hot lime softener 2 and subjected to a lime softening process. Because the first concentrated water is heated to a high temperature in the process in which it is evaporatively concentrated by heat exchange with hot steam in the first evaporator 1, it can satisfy the operating temperature of the hot lime softener 2 without having to use an additional heat source. Herein, the temperature of the first concentrated water that is introduced into the hot lime softener 2 is preferably in the range of approximately 90 to 110° C.

In the hot lime softener 2, hardness-causing substances, such as calcium (Ca) and magnesium (Mg), contained in the first concentrated water, are precipitated by reaction with lime, whereby they are separated and removed. In addition, silica adheres to the surface of aggregated magnesium ions or forms insoluble calcium-magnesium silicate, whereby it is removed. Specifically, the hot lime softener 2 may comprise: a reactor configured such that a precipitation reaction of hardness-causing substances and lime occurs therein; a precipitator configured such that aggregated particles physically and chemically grow therein; and a clarifier configured such that grown particles are separated by settlement to thereby provide softened water.

As used herein, the term "lime" is intended to encompass any substances, including lime (CaO), hydrated lime (Ca(OH)$_2$), soda ash (Na$_2$CO$_3$) and the like, which can induce a precipitation reaction of various salts of calcium or magnesium as described above.

After the first concentrated water is subjected to the lime softening process in the lime softener 2 to remove hardness-causing substances, it is introduced into the second evaporator 3 in which it is further evaporatively concentrated by heat exchange with hot steam to form second concentrated water. Herein, because the first concentrated water which is evaporatively concentrated in the second evaporator was already subjected to the hot lime softening process to remove hardness-causing substances, it can be concentrated to saturation without the risk of scale formation.

This second evaporator 3 may be a vertical tube falling film evaporator including evaporation tubes 8, like the first evaporator 1. It may also be a reduced pressure evaporator in which reduced pressure evaporator occurs.

The second concentrated water formed by concentration in the second evaporator 3 may be crystallized through a forced circulation evaporator 18, before it is discharged to a concentrated water discharge unit 23. Herein, the forced circulation evaporator 18 may comprise: a heat exchanger configured to heat the second concentrated water by a heating medium; and a gas-liquid separator configured to inject the heated second concentrated water into a chamber and evaporate the injected water to separate it into steam and a concentrate. The concentrate discharged from the gas-liquid separator is recycled to the heat exchanger by a pump.

As shown in FIG. 3, the apparatus of the exemplary embodiment may further comprise a gas-liquid separator 9 configured such that steam present as two phases together with concentrated water in the bottom of the first evaporator 1 and/or the second evaporator 3 is introduced therein and water mist remaining in the steam is separated and removed.

In other words, in order to remove water mist and hardness-causing substances (such as silica) contained in steam present as two phases together with the first concentrated water in the bottom of the first evaporator 1, the steam is introduced into the gas-liquid separator 9. Herein, condensed water formed by heat exchange of hot steam supplied to the first evaporator 1 and/or the second evaporator may be sprayed to the steam introduced into the gas-liquid separator 8 to thereby rinse hardness-inducing substances together with water, whereby hardness-causing substances contained in the steam can be separated and removed.

The gas-liquid separator 9 is preferably a cyclone-type gas-liquid separator 9 in which the condensed water is sprayed in the tangential direction of the inner circumferential surface of the gas-liquid separator 9 and moves along the inner circumferential surface in the form of spiral flow.

Figure 6:
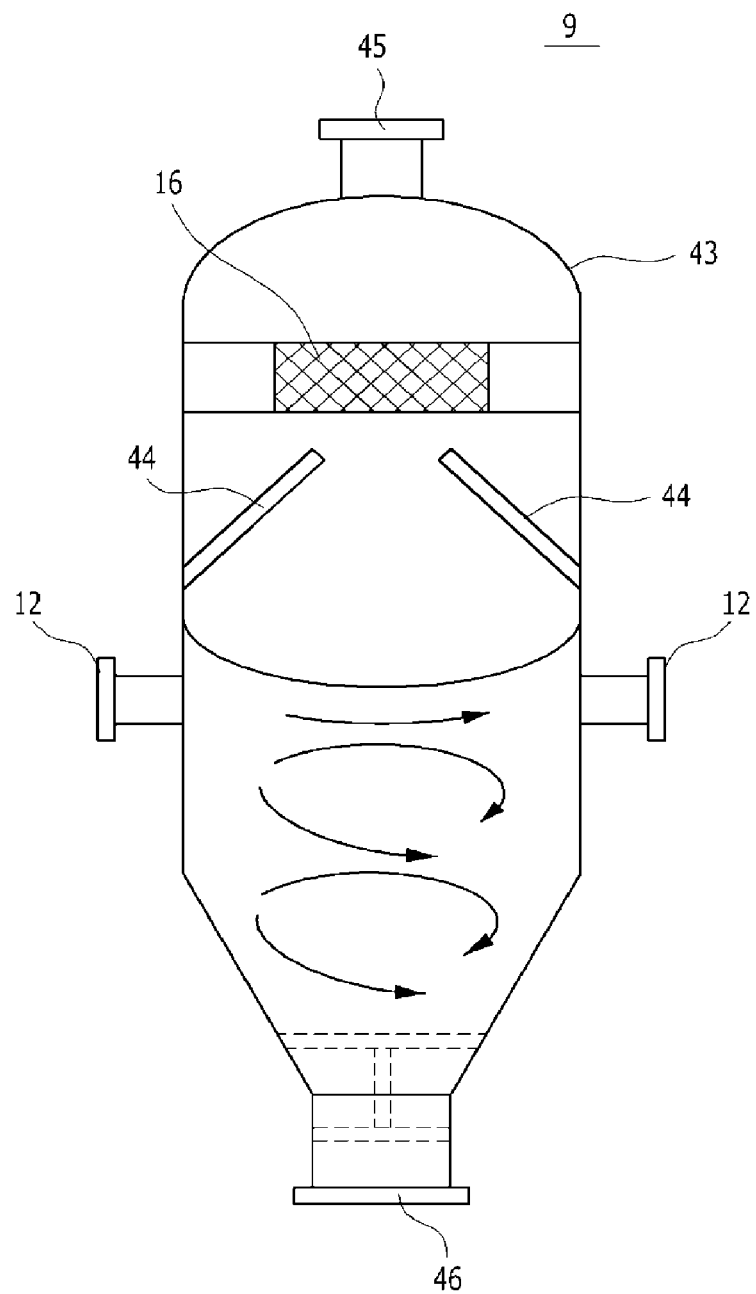
FIG. 6 schematically shows a gas-liquid separator according to an exemplary embodiment.

As shown in FIG. 6, the cyclone-type gas-liquid separator 9 may comprise: a chamber 43 having an internal space configured such that steam is discharged through a steam outlet 45 at the top and condensed water is discharged through a concentrate outlet 46 at the bottom; an inlet unit 12 connected to the side of the chamber 43 in the tangential direction of the inner circumferential surface of the chamber 43 such that the condensed water moves along the inner circumferential surface of the chamber 43 in the form of spiral flow, the inlet unit 12 being configured to spray the condensed water; and a demister 16 disposed in the upper portion of the chamber 43 so as to divide the internal space of the chamber 43 and configured to remove mist contained in steam. Herein, the demister 16 may be a mesh-type plate member.

In addition, at least one barrier 44 for preventing rising of mist contained in the steam produced may be provided in the chamber 43 of the gas-liquid separator 9.

During the production and rising of steam, large and small drops (mist) also rise, and relatively large drops are blocked by the barrier 44 and descend by gravity.

The barrier 44 is may be provided in the internal space of the chamber 43 between the inlet unit 12 and the steam outlet 45, and may be formed to protrude from the inner wall of the chamber 43. More preferably, as shown in FIG. 6, it may be formed to protrude from the inner wall of the chamber 43 so as to be inclined upward at an angle of approximately 90-180°. In this case, the rising of mist and the descent of blocked mist can be more effectively induced.

After water and hardness-causing substances such as silica are removed from the steam by the gas-liquid separator 9, the steam is introduced into a compressor 10 in which it is compressed. Then, the compressed steam is supplied to the first evaporator 1 in which it is used as a heat source for evaporative concentration of water to be treated.

Steam that is generated by evaporative concentration in the second evaporator 3 may be introduced again into the second evaporator 3 after passage through the gas-liquid separator 9 and the compressor 10 as described above, so that it can be used as a heat source. Herein, a single gas-liquid separator 9 and a single compressor 10 are preferably used to treat the steams generated in the first and second evaporators 1 and 3, but are not limited thereto.

Meanwhile, condensed water that is formed by heat exchange of hot steam supplied to the first evaporator 1 or the second evaporator 3 may be heat-exchanged in the heat exchanger 11 with the water to be treated which is introduced into the first evaporator 11, before it is discharged to the condensed water discharge unit 22. In this case, the water to be treated is pretreated before it is introduced into the first evaporator 1, and the temperature of the condensed water is reduced before it is discharged to the outside, thus reducing environmental pollution problems caused by waste heat.

In addition, all or part of the condensed water may be introduced into the gas-liquid separator 9 as described above so that it may be reused to remove hardness-causing substances from steam.

Figure 4:
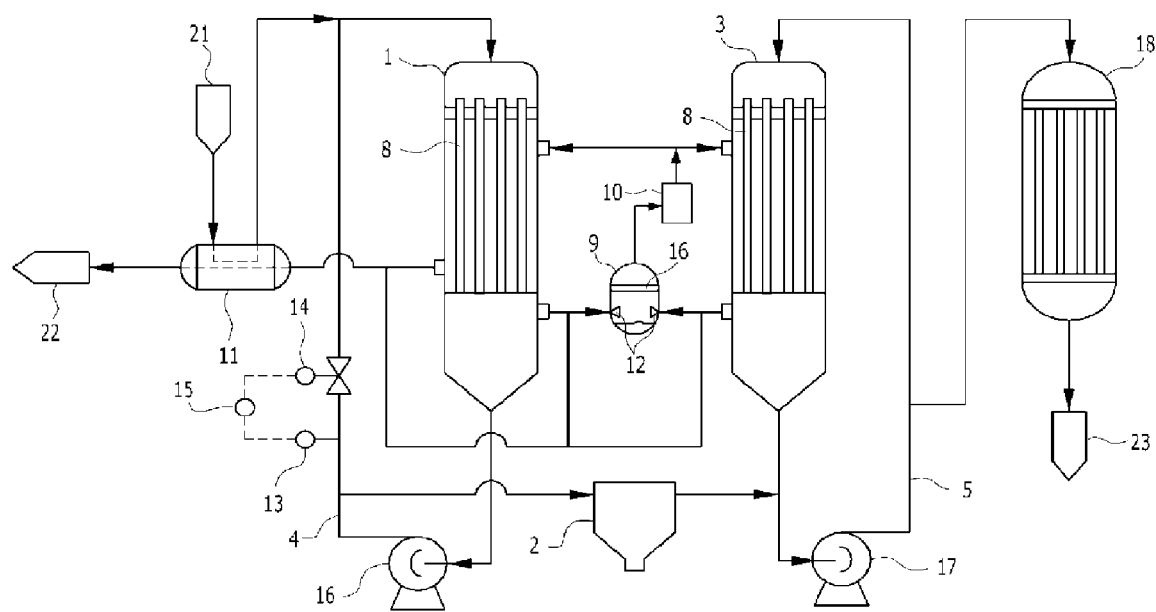
FIG. 4 schematically shows an apparatus for evaporative concentration of water to be treated, which uses hot lime softening, according to an exemplary embodiment, in which the apparatus further includes recycling lines.

FIG. 4 schematically shows an apparatus for evaporative concentration of water to be treated, which uses hot lime softening, according to an exemplary embodiment, in which the apparatus further comprises recycling lines 4 and 5.

As shown in FIG. 4, the apparatus for evaporative concentration of water using hot lime softening according to an exemplary embodiment may further comprise: a recycling line 4 through which all or part of the first concentrated water may be introduced again into the first evaporator 1 in which it is concentrated again; and a recycling line 5 through which the second concentrated water may be introduced again into the second evaporator 3.

The recycling lines 4 and 5 as described above make it possible to efficiently perform not only the process in which the first concentrated water is evaporatively concentrated at a concentration factor at which hardness-causing substances such as silica are not precipitated, but also the process in which the second concentrated water is evaporatively concentrated to saturation.

Although exemplary embodiments have been described for illustrative purposes, those skilled in the art will appreciate that various modifications, additions and substitutions are possible, without departing from the scope and spirit of the inventive concept as disclosed in the accompanying claims.

What is claimed is:

1. An apparatus for evaporative concentration of water, containing hardness-causing substances, to be treated using hot lime softening, the apparatus comprising:
   a first evaporator configured to treat the water by evaporatively concentrating the water by first heat exchange with hot steam to thereby (i) form first concentrated water and (ii) reduce an amount of the water to be introduced to a hot lime softener, wherein the first evaporator is disposed before the hot lime softener such that the first concentrated water is introduced to the hot lime softener to increase precipitation of hardness-causing substances contained in the first concentrated water without an additional heat source used for satisfying operating temperature condition of the hot lime softener;
   the hot lime softener configured to:
      precipitate and separate the hardness-causing substances from at least a portion of the first concentrated water from the first evaporator by reaction with lime, wherein an amount of the lime is determined based on the reduced water introduced from the first evaporator, and
      remove the hardness-causing substances from the first concentrated water; and
   a second evaporator configured to form second concentrated water by further evaporatively concentrating at least a portion of the first concentrated water that passed through the hot lime softener by second heat exchange with hot steam.

2. The apparatus of claim 1, wherein a temperature of the first concentrated water that is introduced into the hot lime softener is approximately 90° C. to 110° C.

3. The apparatus of claim 1, wherein the first evaporator has a concentration factor of 5-10.

4. The apparatus of claim 1, further comprising:
   a recycling line providing a path for at least a portion of at least one of the first concentrated water and the second concentrated water to be introduced into the first evaporator or the second evaporator so as to be concentrated again.

5. The apparatus of claim 1, wherein at least one of the first evaporator and the second evaporator is a vertical tube falling film (VTFF) evaporator comprising a plurality of evaporation tubes therein and configured to evaporate the water to be treated by heat exchange with hot steam supplied to outer walls of the plurality of evaporation tubes while the water flows in the form of a falling film along inner walls of the evaporation tubes.

6. The apparatus of claim 1, wherein at least one of the first evaporator and the second evaporator is a reduced pressure evaporator in which reduced pressure evaporation occurs.

7. The apparatus of claim 1, further comprising:
   a gas-liquid separator configured to separate and remove water mist remaining in steam present as two phases together with concentrated water at a bottom of at least one of the first evaporator and the second evaporator, wherein condensed water formed by heat exchange of hot steam supplied to at least one of the first evaporator and the second evaporator is sprayed into the steam so that hardness-causing substances contained in the steam are separated and removed.

8. The apparatus of claim 7, further comprising:
   a compressor configured to compress the steam from which the hardness-causing substances and the water mist were removed in the gas-liquid separator and to supply the compressed steam to at least one of the first evaporator and the second evaporator.

9. The apparatus of claim 7, wherein the gas-liquid separator comprises a cyclone-type gas-liquid separator configured to:
   spray the condensed water in a tangential direction of an inner circumferential surface of the gas-liquid separator; and
   move the condensed water in a form of spiral flow along the inner circumferential surface of the gas-liquid separator.

10. The apparatus of claim 9, wherein the gas-liquid separator comprises:
   a chamber having an internal space, a steam outlet and a concentrate outlet, wherein steam is discharged through the steam outlet provided at a top of the chamber and the condensed water is discharged through the concentrate outlet provided at a bottom of the chamber;
   an inlet unit connected to a side of the chamber in the tangential direction of the inner circumferential surface of the chamber such that the condensed water moves in the form of spiral flow along the inner circumferential surface of the chamber, the inlet unit being configured to spray the condensed water; and a demister disposed in an upper portion of the chamber so as to divide the internal space of the chamber and configured to remove mist contained in the steam.

11. The apparatus of claim 10, wherein the gas-liquid separator further comprises, in the chamber, at least one barrier configured to prevent the mist contained in the steam from rising.

12. The apparatus of claim 11, wherein the at least one barrier is configured to protrude from an inner wall of the chamber so as to be inclined upward at an angle of approximately 90-180°.

13. The apparatus of claim 1, further comprising:

a heat exchanger in which condensed water formed by heat exchange of hot steam supplied to at least one of the first evaporator and the second evaporator is heat-exchanged with the water to be treated which is introduced into the first evaporator.

14. A method for evaporative concentration of water, containing hardness-causing substances, to be treated using hot lime softening, the method comprising:

treating the water by evaporatively concentrating the water by first heat exchange with hot steam to thereby (i) form first concentrated water and (ii) reduce an amount of the water to be introduced to a hot lime softener, wherein the process of forming the first concentrated water is performed to increase precipitation of hardness-causing substances contained in the first concentrated water without an additional heat source used for satisfying operating temperature condition for precipitating the hardness-causing substances;

introducing at least a portion of the first concentrated water into the hot lime softener in which the hardness-causing substances are precipitated and separated by reaction with lime, thereby the hardness-causing substances being removed, wherein an amount of the lime is determined based on the reduced water introduced from the first evaporator; and introducing at least a portion of the first concentrated water, from which the hardness-causing substances were removed, into a second evaporator in which the at least a portion of the first concentrated water, from which the hardness-causing substances were removed, is further evaporatively concentrated by heat exchange with hot steam, thereby forming second concentrated water.

15. The method of claim 14, wherein a temperature of the first concentrated water that is introduced into the hot lime softener is approximately 90° C. to 110° C.

16. The method of claim 14, wherein the first evaporator is operated to have a concentration factor of 5-10.

17. The method of claim 14, wherein at least one of the introducing the water to be treated into the first evaporator and the introducing the at least a portion of the first concentrated water, from which the hardness-causing substances were removed comprises a process in which at least a portion of the first concentrated water or the second concentrated water is introduced again into the first evaporator or the second evaporator so that it is concentrated again.

18. The method of claim 14, wherein the evaporative concentration in at least one of the introducing the water to be treated into the first evaporator and the introducing the at least a portion of the first concentrated water, from which the hardness-causing substances were removed is performed by reduced pressure evaporation.

19. The method of claim 14, further comprising:

introducing steam present as two phases together with the concentrated water after at least one of the introducing the water to be treated into the first evaporator and the introducing the at least a portion of the first concentrated water, from which the hardness-causing substances were removed into a gas-liquid separator in which water mist remaining in the steam is separated and removed, wherein condensed water formed by heat exchange of hot steam supplied to at least one of the first evaporator and the second evaporator is sprayed to the steam which is introduced into the gas-liquid separator so that hardness-causing substances contained in the steam are separated and removed.

20. The method of claim 14, wherein, before the introducing the water to be treated into the first evaporator, heat-exchanging condensed water is formed by heat exchange of hot steam supplied to at least one of the first evaporator and the second evaporator with the water to be treated which is introduced into the first evaporator.

* * * * *